(12) United States Patent
Smiley et al.

(10) Patent No.: US 7,376,664 B2
(45) Date of Patent: *May 20, 2008

(54) METHOD FOR EVALUATING A TRANSFORMER DESIGN

(75) Inventors: Karen J. Smiley, Benson, NC (US); Thomas E. Long, Wake Forest, NC (US); David N. Cox, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 535 days.

This patent is subject to a terminal disclaimer.

(21) Appl. No.: 10/699,468

(22) Filed: Oct. 31, 2003

(65) Prior Publication Data

US 2005/0097134 A1 May 5, 2005

(51) Int. Cl.
*G06F 17/30* (2006.01)

(52) U.S. Cl. .............. 707/102; 707/3; 707/6; 707/10; 707/101; 707/103 Z; 707/104.1

(58) Field of Classification Search .......... 707/3, 707/10, 104.1, 101, 102, 103 Y, 6, 7, 103 Z; 716/1; 709/229, 225, 246; 324/765; 703/18
See application file for complete search history.

(56) References Cited

U.S. PATENT DOCUMENTS

| | | | |
|---|---|---|---|
| 5,311,438 A | 5/1994 | Sellers et al. | 364/468 |
| 5,463,555 A | 10/1995 | Ward et al. | 364/468 |
| 5,604,892 A * | 2/1997 | Nuttall et al. | 703/18 |
| 5,835,764 A | 11/1998 | Platt et al. | 395/671 |
| 6,167,403 A * | 12/2000 | Whitmire et al. | 707/10 |
| 6,304,095 B1* | 10/2001 | Miyamoto | 324/765 |
| 6,311,178 B1* | 10/2001 | Bi et al. | 707/3 |
| 6,311,179 B1* | 10/2001 | Agarwal et al. | 707/3 |
| 6,324,523 B1 | 11/2001 | Killeen, Jr. et al. | 705/35 |
| 6,345,259 B1 | 2/2002 | Sandoval | 705/7 |
| 6,477,521 B1 | 11/2002 | Kuomura et al. | 707/1 |
| 6,536,012 B1* | 3/2003 | Mizuno | 716/1 |
| 6,633,772 B2 | 10/2003 | Ford et al. | 600/345 |
| 6,636,862 B2 | 10/2003 | Lundahal | 707/101 |

(Continued)

FOREIGN PATENT DOCUMENTS

EP 0 567 291 A2 10/1993

(Continued)

OTHER PUBLICATIONS

Geromel et al., "The Application of Intelligent system in power Transformer Design", IEEE, 2002, pp. 285-290.*
Doulamis et al., "A Synergetic Neural Network-generic Scheme for Optimal Transformer Construction", IOS Press, 2002, pp. 37-56.*
Meinert et al., Inrush-Modeling of a single-phase 1-MVA-HTS (High Temperature Superconducting)-Transformer for Rail Vehicles, IEEE, Jul. 2003; pp. 2379-2386.*

(Continued)

*Primary Examiner*—Thuy N. Pardo
(74) *Attorney, Agent, or Firm*—Paul R. Katterle; Michael C. Prewitt

(57) ABSTRACT

A preferred method for evaluating a transformer design using data representing test results from a plurality of transformers and stored in a data base includes comparing the data representing test results to predetermined criteria for the test results to determine whether the test results satisfy the predetermined criteria. The preferred method also includes counting the number of the test results that do not satisfy the predetermined criteria, and generating an indication that a predetermined quantity of the test results do not satisfy the predetermined criteria if at least the predetermined quantity of the test results do not satisfy the predetermined criteria.

4 Claims, 4 Drawing Sheets

U.S. PATENT DOCUMENTS

| | | | |
|---|---|---|---|
| 6,643,652 | B2* | 11/2003 | Helgeson et al. ............. 707/10 |
| 6,708,186 | B1* | 3/2004 | Claborn et al. ............. 707/102 |
| 6,795,860 | B1* | 9/2004 | Shah ........................ 709/229 |
| 6,954,751 | B2* | 10/2005 | Christfort et al. ............. 707/6 |
| 2001/0042092 | A1 | 11/2001 | Kudo et al. ................. 709/200 |
| 2002/0049749 | A1* | 4/2002 | Helgeson et al. .............. 707/3 |
| 2002/0073080 | A1* | 6/2002 | Lipkin ........................... 707/3 |
| 2002/0073236 | A1* | 6/2002 | Helgeson et al. ........... 709/246 |
| 2002/0138617 | A1* | 9/2002 | Christfort et al. ........... 709/225 |
| 2002/0143598 | A1 | 10/2002 | Scheer ........................... 705/9 |

FOREIGN PATENT DOCUMENTS

| | | |
|---|---|---|
| EP | 0 721 625 B1 | 4/2002 |
| WO | WO 95/09387 | 4/1995 |
| WO | WO 98/57285 | 12/1998 |
| WO | WO 99/15979 | 4/1999 |
| WO | WO 00/72145 A1 * | 11/2000 |
| WO | WO 01/02928 A2 | 1/2001 |
| WO | WO 01/50405 A1 | 7/2001 |

OTHER PUBLICATIONS

Zhou Zexin et al., "Dynamic Simulation Inspection Test for Protection Equipment in China", IEEE, 2002, pp. 280-284.*

Aldred, K., "Aerospace Manufacturer takes off with Paperless Manufacturing System", *IEEE Solutions*, 1998, 55-57.

Chase, N., "Paperless Manufacturing Pays Off", *Quality*, Nov. 1998, 46-47.

deSpautz, J., "Quantifying the Benefits of Automation", *ISA Transactions*, 1994, 33, 107-112.

Eckerson, W., "Paperfree Factory gets Patriot Flying", *Network World*, 8(52), 2 pages.

Fouhy, k. et al., "Paperless Batch Plants become a Reality", *Chemical Engineering*, 1995, 31-33.

Fuller, L.F. et al., "A Joint Industry_university CIM Project for University Microelectronics Manufacturing", *IEEE*, 1991, 37-40.

Gould, L., "Data Collection Leads to Paperless Manufacturing", *Managing Automation*, May 1993, 48-49.

Jain, H.K. et al., "E-R Approach to Distributed Heterogeneous Database Systems for Integrated Manufacturing", *Information Resources Management Journal*, 1992, 3(1), 21-29.

Johanson, D.C. et al., "Application of a B&W Developed Computer Aided Pictorial Process Planning System to CQMS for Manufacturing Process", *Supercollider 4*, 1992, 513-516.

Haverson, D.S., RS/6000 Drives Paperless Manufacturing, *Applied Solutions*, 21-22.

Han, M.H. et al., "Flow Control in Flexible Manufacturing: Minimization of Stockout Cost", *Int. J. Prod. Res.*, 1989, 27(4), 701-715.

Lindo, W., "Workflow Management und Optimierung der Geschaftsprozesse", *ZWF*, 1996, 91, 419-420.

Naylor, A.W. et al., "Design of Integrated Manufacturing System Control Software", *IEEE Transactions on Systems, Man, and Cybernetics*, 1987, 17(6), 881-897.

Ram, S.N. et al., "Paperless Manufacturing for IC Assembly", *IEEE/SEMI Int'l Semiconductor Manufacturing Science Symposium*, 1992, 90-93.

Remson, M.G., "Paperless Manufacturing, A Challenge Now and in the Future", *IEEE/SEMI Int'l Semiconductor Manufacturing Science Symposium*, 1991, 89-94.

Saad, et al., "Effectiveness of Dynamic Rescheduling in Agent-Based Flexible Manufacturing Systems", *SPIE*, 3203, 88-99.

Vasilash, G.S., "Meeting the Future Head-on (Machinery Manufacturing)", *Production*, Jul. 1993, 50-55.

Vide, J.J. et al., "FMS Work Flow Optimization", *Proceedings of the 1986 Summer Computer Simulation Conference*, 1986, 705-710.

von Hardenberg, P.W. et al., "Use of Integrated Knowledge-Based Systems for Helicopter Design and Manufacturing", *American Helicopter Society 51st Annual Forum*, 1995, 1-10.

Shop Solutions-"Islands of Automation have Paperless Links", *Manufacturing Engineering*, 1997, 134-136.

"Revamping Manufacturing", *Computer-Aided Engineering*, 1995, 10-11.

Min-Hong, H., "Work Flow Control in Automated Manufacturing", Georgia Institute of Technology.

Dewhurst, F. et al., "Towards Integrated Manufacturing Planning with Common Tool and Information Sets", *International Journal of Operations & Production Management*, 2001, 21(11), 1460-1482.

Fung, R.Y.K. et al., "Adaptive Production Scheduling of Virtual Production Systems Using Object-Oriented Petri Nets with Changeable Structure", *Intl. J. Prod. Res.*, 2002, 40(8), 1759-1785.

Greenwell, R.M. et al., "Computer-aided Acquisition of Manufacturing Information", *Advances in Engineering Software*, 1994, 20, 1-12.

Guide, Jr., V.D.R. et al., "Rough-cut Capacity Planning for Remanufacturing Firms", *Production Planning & Control*, 1997, 8(3), 237-244.

Hitomi, K., "Strategic Integrated Manufacturing Systems: The Concept and Structures", *International Journal of Production of Economics*, 1991, 25, 5-12.

Jain, H.K. et al., "E-R Approach to Distributed Heterogeneous Database Systems for Integrated Manufacturing", *Information Resource Management Journal*, 1992, 3(1), 21-29.

Jean-Luc, G., "Automated Shop Floor Control System and Method of Operation Thereof", *Patents Alert*, 5530857, p. 87.

Naylor, A.W., et al., "Design of Integrated Manufacturing System Control Software", *IEEE Transactions on Systems, Man, and Cybernetics*, 1987, SMCI7-(6), 881-897.

Oreshin, K.P. et al., "Integrated Multilevel System for Control of Production of the KAMAZ Work Complex", *Soviet Journal of Instrumentation and Control*, 1983, 4, 13-15.

Ouelhadj, D. et al., "A Multi-Contract Net Protocol for Dynamic Scheduling in Flexible Manufacturing Systems (FMS)", *Proceedings of the IEEE International Conference on Robotics & Automation*, 1999, 1114-1119.

Patkai, B., "A Cooperative Scheduling System for Paper Machinery Manufacturing", *IEEE*, 1998, 2518-2521.

Ramaswamy, S.E. et al., "Deadlock-Free Schedules for Automated Manufacturing Workstations", *IEEE Transactions on Robotics and Automation*, 1996, 12(3), 391-400.

Roberts, P.D. et al., A Coordination Strategy for Integrated Operations Management and Control, *Abstracts*, 091, p. 1071.

Saad, A. et al., "Effectiveness of Dynamic Rescheduling in Agent-Based Flexible Manufacturing Systems", *SPIE*, vol. 3203, 88-99.

Slomp, J. et al., "A Manufacturing Planning and Control System for a Flexible Manufacturing System", *Robotics & Computer-Integrated Manufacturing*, 1993, 10(1/2), 109-114.

Zhu, L. et al., "FMS Job-Shop Scheduling Under Disruptions with Consideration of Time and Sequence Deviation", *Proceedings of the IEEE International Symposium on Intelligent Control/Intelligent Systems and Semiotics*, 1999, 138-143.

"Integrated Manufacturing-A Challenge for the 1990s", ESPRIT Consortium AMICE, *Computing and Control Engineering Journal*, 1991, 101-102.

K. Kachigan, *Multivariate Statistical Analysis, A Conceptual Introduction*, 2nd Edition, 1991.

David G.T. Denison, et al., *Bayesian Methods for Nonlinear Classification and Regression*, 2002, John Wiley & Sons, Inc.

Cox, D., "Analyzing Transformer Test Data".

Geromel, L. H. et al., "The Application of Intelligent Systems in Power Transformer Design", *Proceedings of the 2002 IEEE Canadian Conference on Electrical & Computer Engineering*, 2002, 285-290.

Doulamis, N.D., et al., "A Synergetic Neural Network-Genetic Scheme for Optimal Transformer Construction", *Integrated Computer-Aided Engineering*, 2002, 9, 37-56.

Saravolac, M.P., "Use of Advance Software Techniques in Transformer Design", *The Institution of Electrical Engineers*, 1998, 1-11.

Balma, P.M. et al., "Expert Systems for Power Transformer Maintenance, Diagnostics, and Design Review", *Proceedings of the American Power Conference, 58th Annual Meeting*, 1996, 2, 963-967.

\* cited by examiner

METHOD FOR EVALUATING A TRANSFORMER DESIGN

CROSS REFERENCE TO RELATED APPLICATIONS

This application is related to patent application Ser. No. 10/698,276, filed on Oct. 31, 2003, entitled "Transformer Testing", which is incorporated by reference herein in its entirety.

This application is also related to patent application Ser. No. 10/699,467, filed on Oct. 31, 2003, entitled "Transformer Performance Prediction", which is incorporated by reference herein in its entirety.

This application is also related to patent application Ser. No. 10/699,217, filed on Oct. 31, 2003, entitled "Method for Generating and Using a Transformer Model", which is incorporated by reference herein in its entirety.

FIELD OF THE INVENTION

The present invention relates to transformers for the transformation of electrical power. More particularly, the present invention relates to a method for evaluating a transformer design using test results.

BACKGROUND OF THE INVENTION

Electric power companies and utilities generate electrical power for consumers using power generation units. A power generation unit can be a coal-fired power plant, a hydro-electric power plant, a gas-turbine-driven generator, a diesel-engine-driven generator, a nuclear power plant, etc. The electrical power is transmitted to the consumer via transmission and distribution (T&D) systems. T&D systems can include power lines, protective switches, sectionalizing switches, breakers, reclosers, etc.

Electrical power is typically transmitted over a portion of the T&D system at relatively high voltages to minimize losses. T&D systems typically include transformers that step up the voltage to levels suitable for transmission with minimal losses. Transformers are also used to step down the relatively high transmission voltages to levels suitable for use by the consumer.

The malfunction or failure of a transformer can result in a power outage. The malfunction or failure of a relatively large transformer used, for example, in a substation can result in a power outage that affects a large numbers of consumers. Hence, purchasers of transformers (typically electric power companies and utilities) usually consider transformer reliability when making their buying decisions.

In addition, transformer purchasers usually consider the initial (purchase) cost and operating costs when deciding whether to purchase a particular transformer. The cost of the materials used in the manufacture of a transformer, in general, represents a substantial portion of the purchase cost.

Operating costs are due in large measure to the internal losses within the transformer. These losses, in turn, are related to the efficiency of the transformer. Hence, purchasers of transformers usually demand that transformer manufacturers provide a product with a relatively high efficiency. Purchasers sometimes negotiate a contractual financial penalty from the manufacturer if a transformer does not meet a specified efficiency goal.

In view of the above demands, transformer manufacturers generally attempt to design their products so as to maximize the reliability and efficiency thereof, and to minimize the initial (purchase) cost.

Transformers typically undergo acceptance testing before being shipped to the customer or end user. Acceptance testing is used to verify that the transformer meets certain limits, guarantees, goals, or other requirements, e.g., internal losses below a predefined value (these limits, guarantees, goals, and requirements are hereinafter referred to collectively as "performance requirements.")

A transformer that exceeds its performance requirements may be over-designed, i.e., one or more components of the transformer may be constructed to perform at a level beyond that which is necessary. For example, a transformer that exceeds its requirements for internal losses, i.e., a transformer having lower internal losses than required, may use more steel in its core than necessary.

A component that over-performs is likely more expensive than necessary. Hence, over-performing components can potentially result in lost profits for the manufacturer. Over-performing components can also represent a lost opportunity to lower the price of the transformer and thereby make the transformer more cost-competitive.

A transformer that fails to meets its performance requirements, conversely, may have one or more under-designed components. Modification of such components is usually required for the transformer to meet its performance requirements (and thereby avoid the financial penalties sometimes imposed on manufacturers for performance shortfalls). The required modifications may be relatively minor in some cases, and the benefits associated with such modifications may justify the relatively low expense associated therewith. In cases where major modifications are required, however, the benefits of such modifications may be outweighed by the expense thereof.

SUMMARY OF THE INVENTION

A preferred method for evaluating a transformer design using data representing test results from a plurality of transformers and stored in a data base comprises comparing the data representing test results to predetermined criteria for the test results to determine whether the test results satisfy the predetermined criteria. The preferred method also comprises counting the number of the test results that do not satisfy the predetermined criteria, and generating an indication that a predetermined quantity of the test results do not satisfy the predetermined criteria if at least the predetermined quantity of the test results do not satisfy the predetermined criteria.

A preferred method for evaluating a transformer design using data stored in a data base, the data representing results of transformer testing, comprises evaluating whether the results of transformer testing satisfy predetermined criteria based on the data representing results of transformer testing. The preferred method also comprises counting a number of the results of transformer testing that do not satisfy the predetermined criteria, and determining whether the number of the results of transformer testing that do not satisfy the predetermined criteria exceeds a predetermined quantity.

A preferred embodiment of a computing system comprises a computer having an application processing and storage area, the application processing and storage area comprising a computing engine and a data base having data representing test results for a plurality of transformers stored therein. The computing engine is configured to compare the data representing test results to predetermined criteria for the test results to determine whether the test results satisfy the predetermined criteria, count the number of the test results that do not satisfy the predetermined criteria, and generate an indication that a predetermined number of the test results do not satisfy the predetermined criteria if at least the predetermined number of the test results do not satisfy the predetermined criteria.

A preferred embodiment of a computing system comprises a computer having an application processing and storage area, the application processing and storage area comprising a computing engine and a data base having data stored therein, the data representing results of transformer testing. The computing engine is configured to evaluate whether the results of transformer testing satisfy predetermined criteria based on the data representing results of transformer testing, count a number of the results of transformer testing that do not satisfy the predetermined criteria, and determine whether the number of the results of transformer testing that do not satisfy the predetermined criteria exceeds a predetermined quantity.

BRIEF DESCRIPTION OF THE DRAWINGS

The foregoing summary, as well as the following detailed description of a preferred method and a preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DETAILED DESCRIPTION OF PREFERRED EMBODIMENTS

Figure 1:
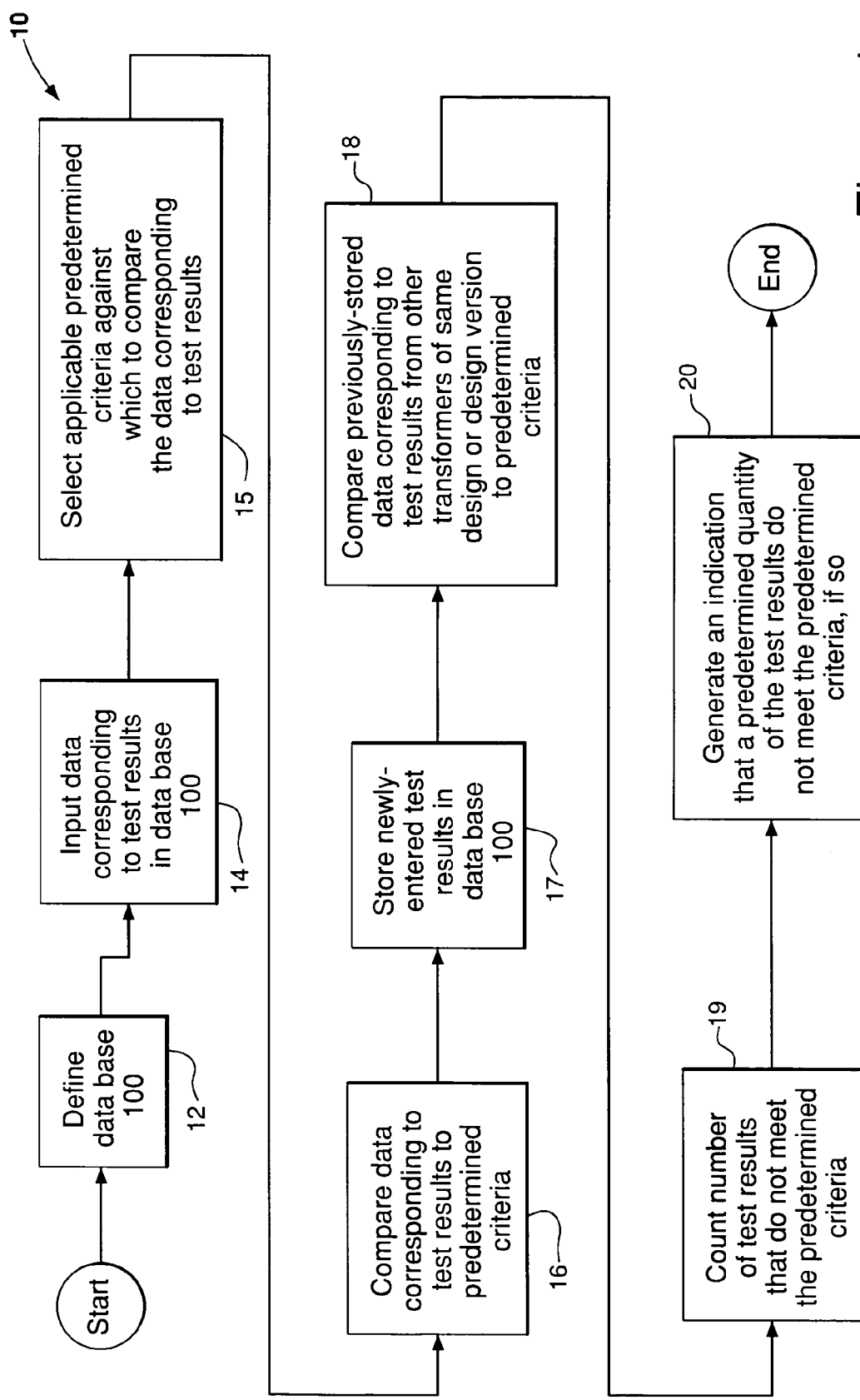
FIG. 1 is a flow diagram depicting a preferred method for evaluating a transformer design.

FIG. 1 depicts a preferred method 10 for evaluating a transformer design. The method 10 comprises defining a data base 100 (designated step 12 in FIG. 1; the data base 100 is depicted in FIG. 2).

The data base 100 can comprise a plurality of test-result tables 102 for storing data corresponding to test results. Each test-result table 102 includes the results of one particular type of transformer test. For example, the three test-result tables 102 depicted in FIG. 2 can include data corresponding, respectively, to the results of sound level, short-circuit, and tank-pressure tests.

Each test-result table 102 can include test results from different transformers. In other words, the results of one particular type of test performed on a plurality of transformers all are stored in one particular test-result table 102 corresponding to that particular type of test.

Figure 2:
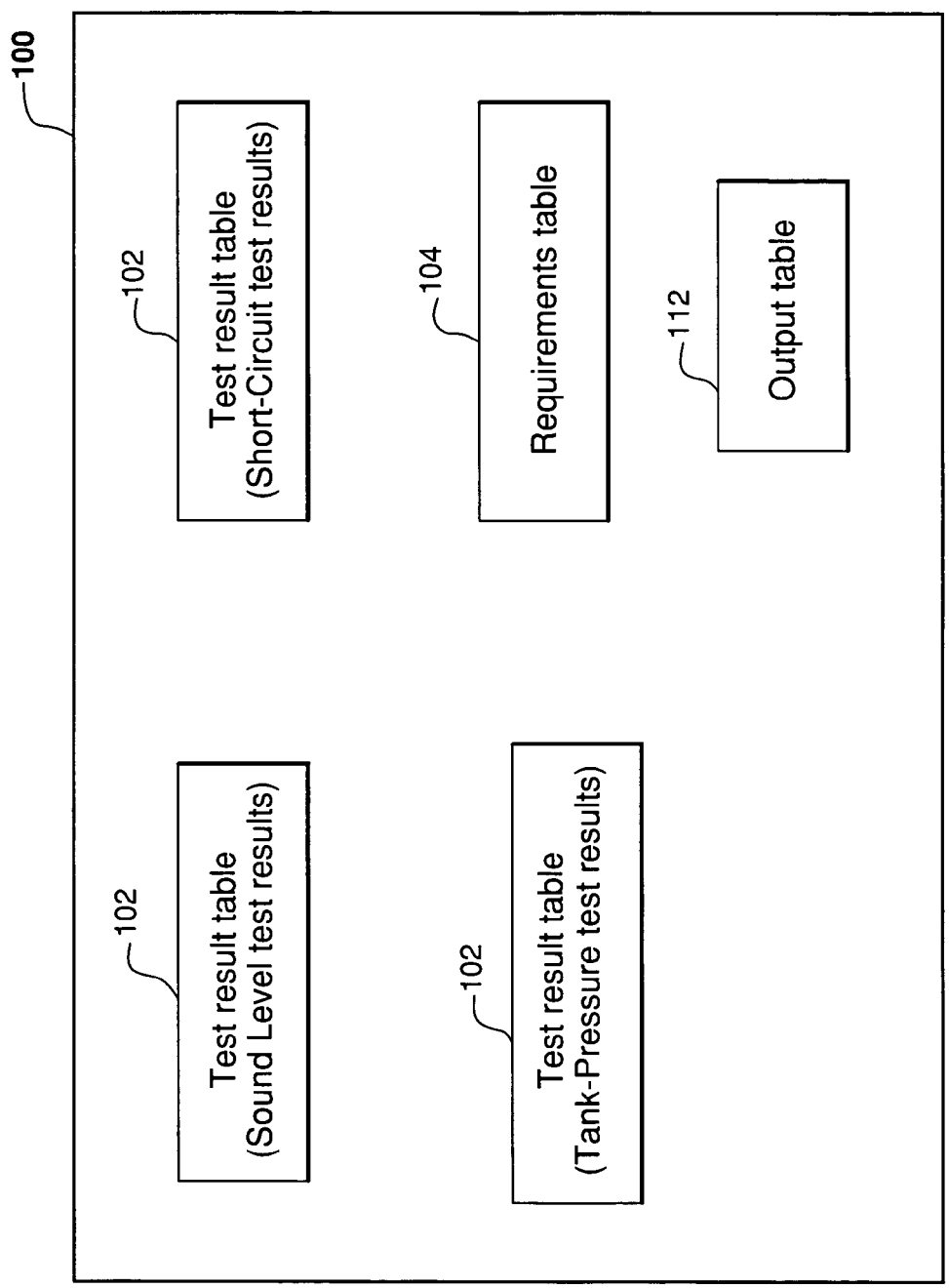
FIG. 2 is a diagrammatic illustration of an exemplary data base configured for use in accordance with the method shown in FIG. 1.

It should be noted that only three of the test-result tables 102 are depicted in FIG. 2, for clarity; the data base 100 in a typical application can include more than three of the test-result tables 102. For example, the results of the following tests can be stored in additional test-result tables 102 in the data base 100: no-load loss; impedance; transformation ratio; turn to turn faults; high potential; double induced; impulse; and heat run. It should also be noted that these particular tests are disclosed exemplary purposes only; data corresponding to the results of other types of tests can be included in the data base 100.

The data stored in the test-result tables 102 can be the results of acceptance testing commonly performed on newly-built or newly-refurbished transformers. Data corresponding to the results of other types of testing, e.g., development testing, can also be stored in the test-result tables 102 in alternative versions of the method 10.

Each of the test-result tables 102 includes data corresponding to one particular type of test, as noted above. Identifying information, e.g., the transformer serial number, is preferably included with each individual data point or data set to designate the particular transformer from which that data point or data set was acquired. Identifying information designating the design and design version (if applicable) of the corresponding transformer is also included with the data point or data set.

The data base 100 also includes a predetermined criterion or criteria for each type of test result corresponding to a particular transformer design or design version. The predetermined criterion or criteria can be, for example, a minimum or maximum acceptable or desired value, an acceptable or desired range, or a set of discrete acceptable or desired values.

The predetermined criteria are stored in a requirements table 104 in the data base 100. The requirements table 104 includes one or more sets of predetermined criteria. Each set corresponds to a particular type of transformer or transformer versions, and includes predetermined criteria corresponding to the results of various types of transformer tests.

The predetermined criterion or criteria for a particular test result does not necessarily correspond to a operating limit for the transformer. Rather, the criteria represent thresholds that, if not met across a statistically significant number of transformers, can serve as an indication that further analysis (and possible modification) of the transformer's design may be warranted. The criteria preferably indicate both minimum and maximum performance requirements. In other words, the criteria are preferably sufficient to indicate whether a particular test result is indicative of over-performance or under-performance.

It should be noted that the above-described configuration of the data base 100 is disclosed herein for exemplary purposes only. The data base 100 can be configured in other suitable manners in alternative embodiments.

The method 10 can be performed using the exemplary computing environment described in detail below. It should be noted that the method 10 is described in connection with this particular computing environment for exemplary purposes only. The method 10 can be used in connection with other types of computing environments.

Figure 3:
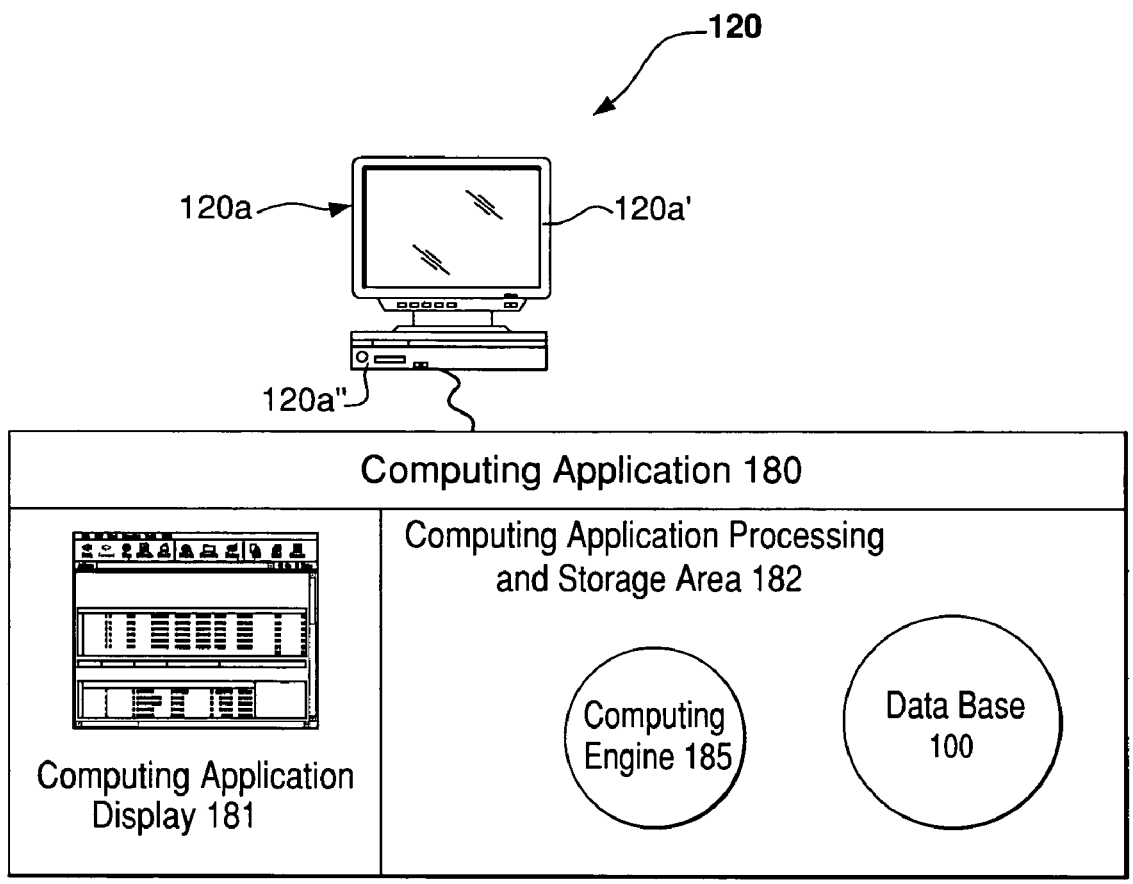
FIG. 3 is a diagrammatic illustration of a preferred embodiment of a computing system configured to perform the method shown in FIG. 1.

FIG. 3 depicts a computing system 120 capable of being configured to perform the method 10. The computing system 120 comprises a computer 120a. The computer 120a includes a display device 120a' and an interface and processing unit 120a". The computer 120a executes a computing application 180. As shown, the computing application 180 includes a computing application processing and storage area 182, and a computing application display 181.

The data base 100 is stored in the computing application processing and storage area 182. The data base 100 can be establish by creating the test-result tables 102 and the requirements table 104, and entering the predetermined criteria for one or more transformer designs or design versions in the requirements table 104. These activities can be performed by way of the interface and processing unit 120a".

The computing application processing and storage area 182 can include a computing engine 185. Although the computing engine 185 is shown as being implemented as a single engine, it should be noted that the computing engine 185 can be implemented as more than one engine in alternative embodiments. Also, the various functions of the computing engine 185 can be distributed among multiple computing engines in any convenient fashion.

Data corresponding to a set of test results from a particular transformer, i.e., results from a plurality of different types of tests performed on the transformer, is input to the data base 100 as the results become available from the test facility (step 14 of FIG. 1). The data can be input to the data base 100 by way of the interface and processing unit 120a" of the computer 120a. The data can be input manually, by way of an automated data link between the computer 120a and the test facility, or by other suitable means. The computing engine 185 can be configured to store each test result from the transformer, and the accompanying identifying data, in the appropriate test result table 102.

The newly-entered test results are compared to the corresponding criteria stored in the requirements table 104 (step 16). The computing engine 185 can be configured to select the appropriate predetermined criteria for a particular set of test results based on the identifying information, i.e., the type of transformer design or design version, that accompanies each data point or data set (step 15). The computing engine 185 can also store the newly-entered test results in the corresponding results tables 104 (step 17).

In addition, previously-stored data from other transformers of the same design or design version is also compared to the applicable predetermined criteria (step 18). In particular, upon input of a new set of data for a particular design or design version to the data base 100, the computing engine 185 retrieves the data from other transformers of the same design or design version previously stored in the data base 100. The computing engine 185 then compares the previously-stored data with the applicable predetermined criteria. (The analysis provided by the method 10 is thus cumulative in nature.)

A determination is made whether to flag (designate) the design or design version as a potential candidate for further analysis (step 20). The computing engine 185 can be configured to make this determination by counting the number of times a particular type of test result for that design or design version fails to meet or otherwise satisfy its predetermined criterion or criteria (step 19). The determination can be based, for example, on the absolute number, i.e., the numerical total, of the times one or more test results fail to meet their respective criteria. Alternatively, the determination can be based on the percentage of times one or more of the test results fail to meet their respective criteria. (The particular value chosen as the threshold for flagging a design or design version is application dependent, and can vary with factors such as the degree of statistical significance desired from the analysis, the size of the data sample available in the data base 100, etc. A particular value therefore is not specified herein.)

The data base 100 can include an output table 112 for storing the information indicating that a particular design or design version has been designated a potential candidate for further analysis (see FIG. 2). The computing engine 185 can be configured to store this information in the output table 112 as the designation is made. Other information can also be stored in the output table 112, including all or some of the test results from the designated design or design version, and the corresponding criteria for the test results.

The output table 112 can be accessed and queried at a later time by a transformer designer, or by other individuals seeking information relating to whether particular transformer designs or design versions should be re-analyzed and possibly modified. The output table 112 can be accessed and queried via the interface and processing unit 120a", and the data stored in the output table 112 can be viewed on the display device 120a' of the computer 120a upon input of an appropriate command. (Alternatively, the computer 120a can be configured to send a notification, e.g., an e-mail message, to one or more other computing or display devices when a particular transformer design or design version is designated a potential candidate for further analysis. The computer 120a can also be configured to download the data stored in the output table 112 to a designated file.)

The transformer designer, upon receiving the information stored in the output table 112, can make a decision whether a particular transformer design or design version warrants further analysis. The predetermined criteria used to indicate the possible need for further analysis are preferably indicative of both minimum and maximum performance requirements, as noted above. Hence, the method 10 can provide an indication that a particular transformer design or design version over-performs or under-performs.

Test results that consistently exceed their corresponding requirements can be an indication that a transformer is over-designed. Further analysis of the transformer's design may indicate that it is possible to modify one or more components so that the components are less expensive, lighter, more compact, etc., while the transformer still meets its performance requirements. Reducing the cost of a transformer component can increase the profits of the manufacturer, or can allow the manufacturer to lower the price of the transformer and thereby make the transformer more cost-competitive.

A consistent shortfall in test results can be an indication that a transformer is under-designed. Further analysis of the transformer's design may indicate that it is possible to modify one or more components with minimal expense so that the transformer meets its performance requirements. In such a case, the additional analysis may reveal that it is cost-effective to modify the transformer to achieve the desired level or performance. Conversely, the further analysis may indicate that the cost of a re-design is prohibitively expensive in view of the potential benefits.

The use of the method 10, by providing a transformer designer with an indication that a particular transformer design or design version may be over-designed or under-designed, can assist in the identification of designs that can be modified in a cost-effective manner to improve the profit margin or cost-competitiveness thereof. Moreover, the method 10 can facilitate the pooling and use of a relatively large population of test data. Hence, the results generated by the method 10, i.e., the determination that a particular transformer design or design version may benefit from re-analysis, can potentially have a relatively high statistical significance.

Figure 4:
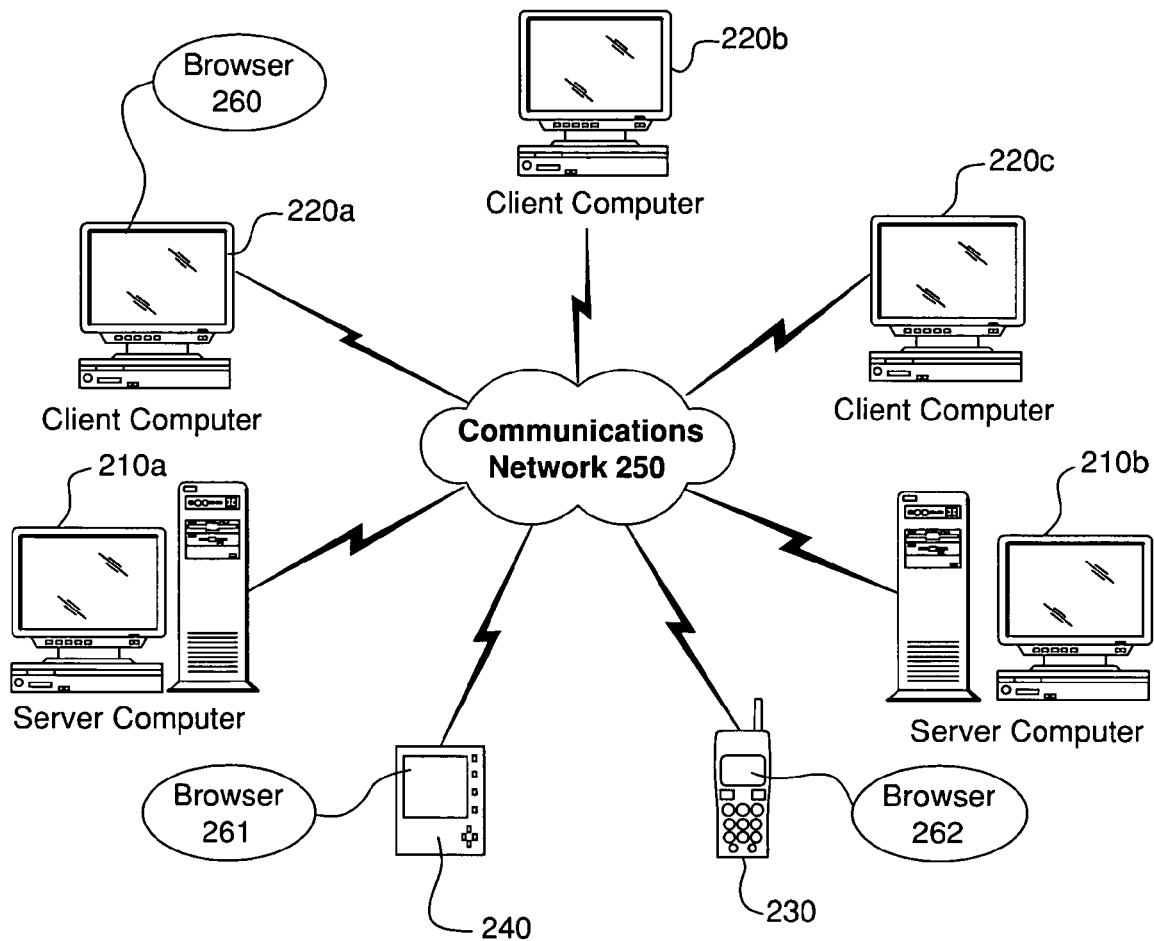
FIG. 4 is a diagrammatic illustration of a preferred embodiment of a data network having a computing system configured to perform the method shown in FIG. 1.

The method 10 can be performed using a data network 240 such as shown in FIG. 4. The data network 240 can include server computers 210a, 210b. The data network 240 can also include client computers 220a, 220b, 220c or other computing devices such as a mobile phone 230 or a personal digital assistant 240. Any of the server computers 210a, 210b or client computers 220a, 220b, 220c can be configured to perform the method 10, in the manner described above in relation to the computing system 120.

The server computers 210a, 210b, client computers 220a, 220b, 220c, mobile phone 230, and personal digital assistant 240 can be communicatively coupled via a communications network 250. The communications network 250 can be a wireless network, a fixed-wire network, a local area network (LAN), a wide area network (WAN), an intranet, an extranet, the Internet, etc.

In a network environment in which the communications network 250 is the Internet, for example, the server computers 210a, 210b can be Web servers which communicate with the client computers 220a, 220b, 220c via any of a number of known communication protocols such as hypertext transfer protocol (HTTP), wireless application protocol (WAP), and the like. Each client computer 220a, 220b, 220c can be equipped with a browser 260 to communicate with the server computers 210a, 210b. Similarly, the personal digital assistant 240 can be equipped with a browser 261, and the mobile phone 230 can be equipped with a browser 262 to communicate with the server computers 210a, 210b.

The data network 240 can thus permit a transformer designer to receive output generated by the method 10 from locations remote from the computing device on which the output is generated and stored. Moreover, transformer test data can be input and processed in accordance with the method 10 from locations remote from the computing device on which the processing operation is performed.

The method 10 can be implemented with a variety of network-based and standalone architectures, and therefore is not limited to the preceding example. Program code (i.e., instructions) for performing the preferred method, including generating and using the model 100, can be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a data-processing machine, such as a computer, the data-processing machine becomes an apparatus for practicing the invention.

Program code, i.e., instructions, for performing the method 10 can be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a data-processing machine, such as a computer, the data-processing machine becomes an apparatus for practicing the invention.

The program code can also be transmitted over a transmission medium, such as over electrical wiring or cabling or fiber optic cabling, over a network, including the Internet or an intranet, or via any other form of transmission wherein, when the program code is received and loaded into and executed by a data-processing machine, such as a computer, the data-processing machine becomes an apparatus for practicing the preferred method. When implemented on a general-purpose processor, the program code combines with the processor to provide an apparatus that operates analogously to specific logic circuits.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed is:

1. A method for evaluating a design for a transformer comprising:
   (a.) providing a database comprising:
      results of a test performed on each of a plurality of transformers;
      criteria sets for evaluating the results of the tests, each criteria set being applicable to a particular transformer design; and
      identification information associated with the criteria sets and the results of the tests, the identification data including transformer design identification;
   (b.) retrieving the test results for a certain transformer design from the database using the identification information;
   (c.) retrieving the criteria for the certain transformer design from the database using the identification information;
   (d.) comparing the retrieved test results to the retrieved criteria;
   (e.) counting the number of the retrieved test results that do not satisfy the retrieved criteria;
   (f.) generating an indication that the certain transformer design needs further analysis only if at least a predetermined quantity of the retrieved test results do not satisfy the retrieved criteria;
   (g.) displaying the indication on a display device;
   (h) determining that the certain transformer design overperforms if the retrieved test results consistently exceed the retrieved criteria; and
   (i) modifying the certain design to reduce the cost of components required by the transformer design.

2. The method of claim 1, wherein the predetermined quantity of the test results is a predetermined numerical total.

3. The method of claim 1, wherein the predetermined quantity of the test results is a predetermined percentage of the test results.

4. The method of claim 1, wherein the test is selected from the group consisting of no-load loss, impedance, transformation ratio, turn to turn faults, high potential, double induced, impulse, and heat run.

* * * * *